Patented Jan. 30, 1923.

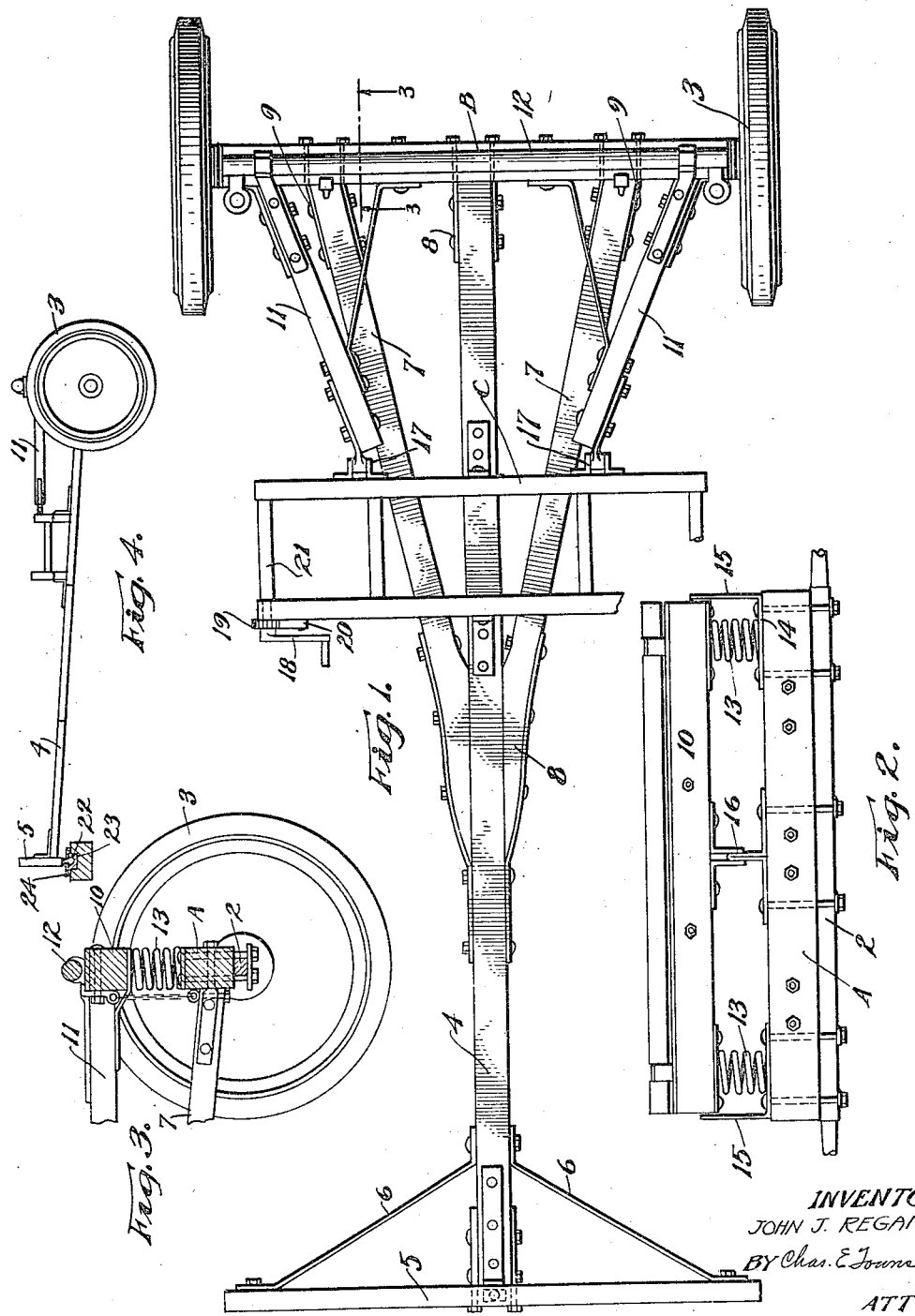

1,443,760

UNITED STATES PATENT OFFICE.

JOHN J. REGAN, OF SAN FRANCISCO, CALIFORNIA.

LUMBER TRAILER.

Application filed June 22, 1921. Serial No. 479,437.

*To all whom it may concern:*

Be it known that I, JOHN J. REGAN, a citizen of the United States, residing at the city and county of San Francisco and State of California, have invented new and useful Improvements in Lumber Trailers, of which the following is a specification.

This invention relates to trailers and especially to that type which is adapted to be attached to a truck or tractor for the purpose of hauling heavy lumber loads and the like.

One of the objects of the present invention is to generally improve and simplify trailers of the character described and especially to provide a trailer of the two-wheel type, adapted for hauling lumber and the like, and which may be readily attached to a truck, tractor or other hauling unit.

Another object of the invention is to provide a load receiving frame and a resilient support therefor, and also to provide novel means for securing the same against lateral movement with relation to the axle bed and wheels.

Further objects will hereinafter appear.

The invention consists of the parts and the construction, combination and arrangement of parts as hereinafter more fully described and claimed, having reference to the accompanying drawings, in which—

Fig. 1 is a plan view of the trailer.

Fig. 2 is an end view of the same, showing the wheels removed.

Fig. 3 is a detail vertical cross section on line 3—3, Fig. 1.

Fig. 4 is a side elevation of the trailer, parts being shown in section.

Referring to the drawings in detail, A indicates the axle bed of the trailer, 2 the axle, and 3 the wheels supporting the same. Rigidly secured to the axle bed is a reach pole 4, and supported by the forward end thereof is a bolster 5. The bolster is braced with relation to the pole by means of strap bars 6 and the rear end of the reach pole is similarly secured with relation to the axle bed by means of side braces 7 and strap bars 8 and 9.

The structure so far described is rigid and forms the main frame of the trailer.

One of the features of the present invention is, however, to provide a resilient support for the lumber or other load carried thereby. This is accomplished by providing a supporting frame generally indicated at B. This frame consists of a cross timber or load bed 10, a pair of arms 11, a roller 12 and a pair of supporting springs 13 interposed between the load bed and the axle bed A. The axle bed is provided with a pair of guide brackets, secured thereto as at 14, and so shaped as to form vertical guides 15 for the load bed or cross timber 10. These guides, together with the center guide 16, secure the supporting frame B against lateral movement with relation to the axle bed and the wheels and thereby relieves the springs 13 of all stress, except compression when a load is being carried. To permit the free vertical movement of the supporting frame, a pivotal connection 17 is formed between the forward ends of the arms 11, and a binder, generally indicated at C. The binder is of usual construction and is supported and secured to the reach pole 4 and the side braces 7; the binder being otherwise provided with a crank 18, a ratchet wheel 19, a pawl 20, and a roller 21, by which the tie or binding rope may be wound when turning movement is transmitted by the crank 18.

For the purpose of forming a simple substantial connection between the forward end of the reach pole and the truck, tractor or other hauling unit employed, a ball joint 22 is employed. The ball is rigidly secured to the underside of the front end of the reach pole and is adapted to be received by a socket 23 secured on the rear frame of the tractor, and it is adapted to be secured therein by a locking plate 24. The ball joint, together with the wheels 3, in reality forms a three-point support for the load. It permits free lateral movement of the trailer as a whole with relation to the tractor, and it also permits flexibility in every direction when rough or undulating road surfaces are being traversed. The connection furthermore eliminates the use of a draw bar and as it can be quickly attached or released, it is obvious that numerous advantages are obtained.

In actual practice when the trailer is attached to a truck or the like, it can be seen that the load will be supported by the roller 12 and the bolster 5; the main weight of the load being however taken care of by the roller 12 for the frame B, and the springs 13 supporting the same. The load when in place will of course be tied in the usual manner by a rope fastened at one end to the binder C, then passed over the load and secured and tightened by the roller 21. A load so supported can be readily released and as it is resiliently supported, it is obvious that tendency to shake the load loose or otherwise disturb its position on the trailer is considerably lessened due to the interposed springs provided and the three-point support formed therefor.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. In a running gear for vehicles, an axle, a bolster above the axle, springs between the axle and bolster adjacent the ends thereof, end guide members mounted on the axle and coacting with the ends of the bolster to prevent movement of the bolster laterally of the running gear, a guiding device between the axle and bolster intermediate the ends thereof to coact with the aforesaid guide members, a load binder mounted on the running gear, a roller mounted on the bolster and a pair of arms pivotally connected to the load binder, and connected to the roller.

2. In a running gear for vehicles, an axle, a bolster above the axle, springs between the axle and bolster adjacent the ends thereof, substantially L-shaped guide members secured to the axle and overlapping the ends of the bolster to prevent movement of the bolster laterally of the running gear, and a guide device between the axle and bolster intermediate the ends thereof to coact with the aforesaid L-shaped guide members and consisting of an upper and a lower portion, the upper portion receiving the lower portion, which latter moves in the upper portion as a guide.

JOHN J. REGAN.